Patented Sept. 9, 1952

2,610,170

UNITED STATES PATENT OFFICE 2,610,170

USE OF PETROLEUM SULFONATES IN PREPARATION OF RESINOUS CONDENSATION PRODUCTS IN BEAD FORM

Lennart A. Lundberg, Stamford, Conn., assignor to American Cyanamid Company, New York, N. Y., a corporation of Maine No Drawing. Application February 17, 1949, Serial No. 77,067

5 Claims. (Cl. 260—49)

This invention relates to ion exchange resins and more particularly, to the production of ion active resins in the form of spheroidal beads.

In the past, liquid polymerizable substances such as styrene, acrylic acid esters and the like have been polymerized in aqueous suspension to produce thermoplastic resins as granular products uniform in composition and particle size. Similarly, spheroidal particles of gels have been prepared by gelation of hydrosols in water-immiscible media. Resins of the thermosetting condensation type such as urea-formaldehyde, melamine-formaldehyde and the like, and particularly resins of the thermosetting condensation type in a cured state such as the ion exchange resins, both anionic and cationic, have however not previously been produced in the form of spheroidal particles or beads of uniform size.

It is an object of the present invention to produce a cation exchange resin active for the removal of cations from, or the exchange of cations in, fluid media in a form which can be used directly, without grinding or screening, in ion exchange processes.

Another object of the present invention is to produce an anion exchange resin active for the removal of anions from, or the exchange of anions in, fluid media in a form which can be used directly, without grinding or screening, in ion exchange processes.

It is another object of the present invention to produce ion exchange resins in the form of spheroidal particles.

A further object of the present invention is to provide a method for preparing a condensation type, thermosetting, synthetic resin in the form of spheroidal beads.

Still another object of the present invention is to convert partially condensed water-soluble resins to cured, water-insoluble ion active resins in bead form.

It is still a further object of the present invention to prepare in bead form an ion exchange resin.

The above and other objects are attained by dispersing an aqueous syrup of a resinous partial condensation product of ingredients which, when fully condensed, produce an insoluble ion active resin, in an organic non-solvent medium by mechanical agitation and in the presence of an anionic surface active agent which is a petroleum sulfonate, and converting the partially condensed product of the dispersed globules thereby formed to an insoluble resin by heating.

The invention will be described in greater detail in conjunction with the specific examples in which proportions are given in parts by weight. It should be understood that the examples are merely illustrative and it is not intended that the scope of the invention be limited to the details therein set forth.

EXAMPLE 1

(1) 175 parts of resin "A" syrup (specific gravity 1.14)
(2) 489 parts of o-dichlorbenzene
(3) 0.8 part of the sodium salt of a sulfonated petroleum fraction having the empirical formula $C_{26}H_{42}SO_3Na$ (2) and (3) are charged into a suitable vessel equipped with an anchor type stirrer, a water trap and means for indicating temperature. The mix is heated to 80° C., the stirrer is adjusted to 150 R. P. M., and (1) is added rapidly. The resulting dispersion is refluxed for one hour at 90°–97° C., 74 parts of water are removed azeotropically, and refluxing is resumed for one hour at 125° C.

The resin beads obtained have the following size distribution: 0.2% on 20 mesh, 66.9% 20–40 mesh, 29.3% 40–60 mesh, and 3.4% through 60 mesh. The resin has a capacity of 18.8 kilograins as calcium carbonate per cubic foot of resin and a density of 19.7 pounds per cubic foot.

EXAMPLE 2

(1) 160 parts of resin "B" syrup (55.0% solids)
(2) 493 parts of o-dichlorbenzene
   103 parts of toluene
(3) 0.03 part [0.005% of the weight of (2)] of the sodium salt of a sulfonated petroleum fraction having the empirical formula $C_{26}H_{42}SO_3Na$ The procedure of Example 1 is followed except that 58.5 parts of water are azeotropically removed and the final reflux at 125° C. is continued for four hours.

EXAMPLE 3

(1) 175 parts of resin "C" syrup
(2) 655 parts of o-dichlorbenzene
(3) 0.33 parts [0.05% of the weight of (2)] of the sodium salt of a sulfonated petroleum fraction having the empirical formula: $C_{26}H_{42}SO_3Na$ (2) and (3) are charged into a vessel as in Example 1 and (1) is added rapidly at 90° C. The resulting dispersion is heated until 67 parts of water are removed azeotropically, and it is then refluxed for four hours at 117° C.

Semi-opaque, white, vitreous beads of resin having a capacity of 20.5 kilograins as calcium carbonate per cubic foot of resin and a density of 24.8 pounds per cubic foot are obtained in the following size distribution: 6.8% on 20 mesh, 31.7% 20–40 mesh, 51.8% 40–60 mesh and 9.7% through 60 mesh.

EXAMPLE 4

(1) 175 parts of resin "D" syrup
(2) 655 parts of o-dichlorbenzene
(3) 0.07 part [0.01% of the weight of (2)] of the sodium salt of a sulfonated petroleum fraction having the empirical formula: $C_{26}H_{42}SO_3Na$ (2) and (3) are charged into a vessel as in Example 1 except that the agitation rate is increased to 210 R. P. M., and (1) is added rapidly at 85° C. The resulting dispersion is first heated until 43 parts of water are removed and then refluxed for two hours at 111° C.

Opaque, white, semi-vitreous beads of resin having a capacity of 14.3 kilograins as calcium carbonate per cubic foot of resin and a density of 15.5 pounds per cubic foot are obtained in the following size distribution: 2.6% on 20 mesh, 25.7% 20–40 mesh, 48.0% 40–60 mesh and 23.7% through 60 mesh.

EXAMPLE 5

(1) 175 parts of resin "E" syrup
(2) 655 parts of o-dichlorbenzene
(3) 0.03 part [0.005% of the weight of (2)] of the sodium salt of a sulfonated petroleum fraction having the empirical formula:

$$C_{26}H_{42}SO_3Na$$

(2) and (3) are charged into a suitable vessel as in Example 1, the stirrer is adjusted to 210 R. P. M., and (1) is added rapidly at 54° C. The resulting dispersion is refluxed for 2.5 hours.

Chalky, porous beads of resin having a capacity of 9.9 kilograins as calcium carbonate per cubic foot of resin and a density of 10.3 pounds per cubic foot are obtained in the following size distribution: 35.7% 20–40 mesh, 51.3% 40–60 mesh and 13.0% through 60 mesh.

EXAMPLE 6

(1) 175 parts of resin "F" syrup
(2) 381 parts of ethylene dichloride
(3) 0.2 part [0.05% of the weight of (2)] of the sodium salt of a sulfonated petroleum fraction having the empirical formula: $C_{26}H_{42}SO_3Na$ (2) and (3) are charged into a vessel as in Example 1 but with the stirrer adjusted to 200 R. P. M. The resulting dispersion is refluxed for 2 hours.

Opaque, vitreous beads of resin having a capacity of 12.2 kilograins as calcium carbonate per cubic foot of resin and a density of 18.5 pounds per cubic foot are obtained in the following size distribution: 9.8% on 20 mesh, 39.8% 20–40 mesh, 36.2% 40–60 mesh and 14.2% through 60 mesh.

EXAMPLE 7

(1) 150 parts of resin "G" syrup
(2) 655 parts of o-dichlorbenzene
(3) 0.7 part [0.1% of the weight of (2)] of the sodium salt of a sulfonated petroleum fraction having the empirical formula: $C_{26}H_{42}SO_3Na$ (2) and (3) are charged into a suitable vessel equipped with an anchor type stirrer, a water trap and means for indicating temperature. The mix is heated to 80° C. and the stirrer adjusted to a rate of 175 R. P. M., whereupon (1) is added rapidly. The resulting dispersion is refluxed for 18 hours at 107° C.

Reddish-brown beads of resin having a capacity of 7.8 kilograins as calcium carbonate per cubic foot of resin and 24.6 pounds per cubic foot are obtained.

EXAMPLE 8

(1) 325 parts of resin "G" syrup
(2) 655 parts of o-dichlorbenzene
(3) 1.3 parts [0.2% of the weight of (2)] of the sodium salt of a sulfonated petroleum fraction having the empirical formula: $C_{26}H_{42}SO_3Na$ The procedure of Example 1 is followed and the dispersion is refluxed for 3 hours at 107° C. The light brown, rigid beads of resin obtained are oven-cured for 3 hours at 100° C. and 18 hours at 150° C. The cured resin has a capacity of 20.6 kilograins as calcium carbonate per cubic foot of resin and a density of 33.9 pounds per cubic foot.

EXAMPLE 9

(1) 175 parts of resin "H" syrup
(2) 585 parts of o-dichlorbenzene
    39.5 parts of toluene
(3) 6.2 parts [1.0% of the weight of (2)] of the sodium salt of a sulfonated petroleum fraction having the empirical formula: $C_{26}H_{42}SO_3Na$ The procedure of Example 7 is followed with an agitation rate of 540 R. P. M., except that 62 parts of water are removed azeotropically by heating about 0.5 hour prior to refluxing for 17 hours at 150° C. The lumpy black powdery product has a particle size range from 5–125 microns, the bulk being within a range of from 35–75 microns.

EXAMPLE 10

(1) 175 parts of resin "I" syrup (specific gravity 1.3)
(2) 45.9 parts of o-dichlorbenzene ⎱ (specific
    59 parts of toluene ⎰ gravity 1.27)
(3) 5.2 parts [1% by weight of (2)] of the sodium salt of a sulfonated petroleum fraction having the empirical formula: $C_{26}H_{42}SO_3Na$ The procedure of Example 1 is followed with 560 R. P. M. rate of agitation, 62.5 parts of water being removed by heating for 0.7 hour, and the resin being cured by refluxing for 8 hours at 150° C. Resin particles of from 14–16 mesh are obtained.

Preparation of resin "A" syrup (1) 189 parts of tetraethylenepentamine (1.0 mols)
(2) 277 parts of epichlorohydrin (3.0 mols)
(3) 466 parts of water (2) is added slowly to (1) and (3) with cooling to maintain the temperature at 45°–55° C. About 0.5 hour is required for the addition. The syrup is then maintained at 50° C. for 0.75–1.5 hours.

Preparation of resin "B" syrup (1) 440 parts of 28% aqueous ammonia (7 mols)
(2) 260 parts of water
(3) 651 parts of epichlorhydrin (7 mols)
(4) 112 parts of 50% aqueous sodium hydroxide (1.4 mols)

(1) and (2) are placed in a suitable vessel equipped with means for indicating temperature and means for agitation, and (3) and (4) are added gradually as follows:

| Time in Mins. | Temp. in °C. | Remarks |
|---|---|---|
| 0 | 22 | add 150 parts of (3). |
| 6 | 40 | clear; hold ±2° C. by external cooling; dropwise addition of (3) started. |
| 44 | 39 | (3) all added; cooling discontinued. |
| 47 | 50 | pH 8.8±.2. |
| 55 | 70 | pH 8.2±.2. |
| 57 | 80 | pH 8.0±.2. |
| 58 | 85 | cool. |
| 61 | 85 | pH 8.0±.2. |
| 67 | 85 | pH 7.7±.2. |
| 69 | 85 | pH 7.5±.2. |
| 73 | 80 | pH 7.0±.2; cool to 20° C. |
| 88 | 20 | add (4); cool. |
| 89 | 32 | |
| 91 | 24 | |

The resin syrup thus obtained has a viscosity of 4.95 minutes or 6.8 poises on #300 Ostwald viscosimeter, and a density of 1.12.

*Preparation of resin "C" syrup*

(1) 126 parts of melamine
(2) 406 parts of 37% aqueous formaldehyde
(3) 215 parts of water
(4) 21 parts of 50% triethanolamine
(5) 183 parts of guanidine nitrate
(6) 44.2 parts of sulfuric acid
(7) 38.1 parts of water
(8) 60.5 parts of sodium chloride (1) is placed in a suitable vessel equipped with means for agitation and means for indicating temperature and (2), (3) and (4) are added thereto. The resulting slurry is heated with steam until solution occurs when (5) is added, causing the temperature to drop to about 65° C. where it is maintained for 10 minutes. (8) is added, and the temperature is maintained at about 65° C. for an additional 5 minutes. The clear, water-white syrup is then cooled to 25° C. and (6) and (7) are slowly added while maintaining the temperature at 27°–38° C. The syrup has a viscosity of 3.0 poises.

*Preparation of resin "D" syrup*

The same procedure as for the preparation of resin "C" syrup is followed except that the temperature during acidification is kept below 30° C. to produce a less viscous syrup.

*Preparation of resin "E" syrup*

Resin "D" syrup is heated until its viscosity is increased to 1.5 poises.

*Preparation of resin "F" syrup*

The procedure of resin "C" syrup preparation is followed, using 126 parts of melamine, 406 parts of formalin, 183 parts of guanidine nitrate, 94 parts of water and 60.5 parts of sodium chloride.

*Preparation of resin "G" syrup*

(1) 94 parts of phenol
(2) 108 parts of 95.5% sulfuric acid
(3) 101 parts of 37% aqueous formaldehyde
(4) 63 parts of water (1) is reacted with (2) at 90°–95° C. The reaction mixture is cooled to below 50° C., and (3) and (4) are added dropwise over a 22 minute period. The ensuing reaction which is very exothermic necessitates close attention in order to maintain the temperature below 50° C. The dark red syrup obtained has a specific gravity of about 1.27 and a viscosity close to 25 centipoises.

*Preparation of resin "H" syrup*

The same procedure as for the preparation of resin "G" syrup is used but with 75 parts, instead of 63 parts, of water.

*Preparation of resin "I" syrup*

(1) 94 parts (1.0 mol) of phenol
(2) 31.6 parts (0.25 mol) of anhydrous sodium sulfite
(3) 27.4 parts (0.25 mol) of 95% sodium bisulfite
(4) 203.0 (2.5 mols) of 37% aqueous formaldehyde The above ingredients are brought together with cooling until the exothermic reaction subsides. The reaction mixture is then heated for 1.5 hours at 90°–95° C. after which the resulting syrup is heated for 0.5 hour with steam. The viscosity of the resulting syrup is about 10 poises as determined by a No. 300 Ostwald viscosimeter.

Anion active resins to which the process of the present invention is applicable include those described in U. S. Patent Nos. 2,285,750, 2,395,825, 2,341,907, 2,402,384 and 2,251,234 as well as those described and claimed in my copending application with James R. Dudley, Serial No. 616,644, filed September 15, 1945. Other anion resins to which the process may be applied include condensation products of acetaldehyde, formaldehyde and polyalkylene polyamines (Serial No. 643,836, filed January 26, 1946); of amino-triazine, aldehyde, and guanido compounds (Serial No. 607,277, filed July 26, 1945); of aminotriazine, aldehyde, strongly basic non-aromatic amines (Serial No. 649,127, filed February 20, 1946); of biguanide, carbonyl compounds and aldehydes (Serial No. 703,481, filed October 16, 1946); of crotonaldehyde, formaldehyde, and polyalkylene polyamines (Serial No. 643,838, filed January 26, 1946); of polyepoxy compounds and alkylene polyamines (Serial No. 655,005, filed March 16, 1946); of glycerol dichlorohydrin and alkylene polyamines (Serial No. 624,606, filed October 25, 1945); of furfural, guanido compounds and carbonyl compounds (Serial No. 703,489, filed October 16, 1946); and of furyl aliphatic amines and aldehydes (Serial No. 642,416, filed January 19, 1946).

Cation active resins to which the process of the present invention is applicable include those described in U. S. Patents Nos. 2,228,159, 2,204,539, 2,230,641, 2,408,615, 2,372,233, 2,361,754 as well as condensation products of bisphenol, a water-soluble sulfite and formaldehyde (Serial No. 676,096, filed June 11, 1946), or bisphenol sulfone, a water-soluble sulfite and formaldehyde (Serial No. 694,817, filed September 4, 1946), sulfonated or phosphonated resinified furfural (Serial No. 652,355, filed March 5, 1946), etc.

In general, my process is applicable to any condensation type anion or cation active resin which has a sufficiently rapid gelation rate for bead formation. When the gelation rate is too slow, the resin globules agglomerate before they become hardened by gel formation.

Petroleum sulfonates generally are useful as the surface active agents in the present process. These petroleum sulfonates or white oil soaps are oil-soluble, water-dispersible organic sulfonates which are produced as by-products in the refining of petroleum distillates with sulfuric acid. I contemplate the use of the alkali metal salts of the sulfonic acids which are produced in the refinement of petroleum distillates with fuming sulfuric acid.

The optimum amount of petroleum sulfonate used will vary, depending upon the rate and type of agitation, the non-solvent medium and particularly its density, the resin dispersant and particularly its viscosity, the desired bead size, etc. The minimum quantity of dispersing agent for any particular system is that amount which will keep the resin dispersed in the non-solvent medium; the maximum quantity is dependent upon the desired size of beads since, in general the larger the quantity of the dispersing agent the smaller the bead. In general, I use from about 0.005% to about 3%, based on the weight of non-solvent medium, of surface active agent.

Organic non-solvent media which may be used in the practice of the process of the present invention will vary, depending upon the particular resin, but in general they must be liquid at room temperature, insoluble in water, stable toward heat (up to about 70°–160° C. at least), not readily hydrolyzable and inert, i. e., non-reactive with the initial resin-forming materials and their partial condensation products. In addition they should preferably boil above about 70°–120° C. and have specific gravities substantially equivalent to those of the resin syrup, generally from about 1.1–1.5. The non-solvent media may each consist of a single compound or they may be mixtures of two or more compounds as in Examples 2, 9 and 10 if the properties of the combination fit the necessary qualifications.

Following are some non-solvent media which may advantageously be used in the process of the present invention:

| | Boiling Point °C. | Specific Gravity |
|---|---|---|
| propylidene dichloride | 87 | 1.143 |
| trimethylenedichloride | 123–5 | 1.201 |
| propylenechloride | 96.8 | 1.159 |
| 1,3-propylenedichloride | 109 | 1.204 |
| trichlorethylene | 87.2 | 1.466 |
| 1,1,2-trichlorethane | 113.5 | 1.441 |
| 1,1,1-trichlorethane | 74.1 | 1.325 |
| o-dichlorbenzene | 179 | 1.305 |
| ethylene dichloride | 83.7 | 1.256 |
| 1,2,4-trichlorbenzene | 213 | 1.446 |
| 3,3'-dichlorodi-n-propyl ether | 215 | 1.140 |
| sym. dichlorethyl ether | 178.5 | 1.222 |
| 2,2-dichlorethanol-1 | 146 | 1.145 |
| nitrobenzene | 211 | 1.205 |
| o-nitroethylbenzene | 227 | 1.126 |
| o-nitrophenetol | 275 | 1.190 |
| o-nitrotoluene | 223 | 1.163 |
| 1,2-dimethyl-5-nitrobenzene | 240 | 1.147 |
| p-fluorochlorbenzene | 130 | 1.226 |
| fluoronaphthalene | 212 | 1.133 |
| 1-bromohexane | 156 | 1.173 |
| 1-bromoctane | 188 | 1.099 |
| 1-brompropane | 71 | 1.353 |
| diphenyl ether | 235 (60 mm.) | 1.205 |

Non-solvent media of higher than the preferred specific gravity may be diluted with less dense liquids such as toluene and/or xylene until the density of the combination is substantially equivalent to that of the resin syrup and then used satisfactorily in the present process. A few of these media of higher specific gravity are

| | Boiling Point °C. | Specific Gravity |
|---|---|---|
| sym. tetrachlorethane | 146.3 | 1.600 |
| sym. tetrabromethane | 151 (54 min.) | 2.964 |
| 1,1,2-tribromethane | 188 | 2.579 |

Furthermore, non-solvent media of lower than the preferred specific gravity may also be used if other variables of the system in question are modified to counteract the effect of the density differential between the resin and the non-solvent therefor. Such variables include, for example, the efficiency (rate and type) of agitation which should be stepped up and the viscosity of the resin syrup which should, if possible, be heavier. Preferred media of lower specific gravity include

| | Boiling Point °C. | Specific Gravity |
|---|---|---|
| toluene | 110.8 | 0.886 |
| o-xylene | 144 | 0.881 |
| m-xylene | 139.3 | 0.867 |
| p-xylene | 138.5 | 0.861 |
| 1,2,3-trimethylbenzene | 176.1 | 0.894 |
| 1,2,4-trimethylbenzene | 169.3 | 0.876 |
| 1,3,5-trimethylbenzene | 164.8 | 0.865 |
| ethyl benzene | 136.2 | 0.867 |
| isopropylbenzene | 152.5 | 0.862 |
| p-cymene | 176–7 | 0.857 |

In the event that an extremely inert non-solvent medium is required, suitable liquids include xylene hexafluoride, xylene hexachloride, toluene trifluoride, those fluorcarbons and fluorochlorocarbons having the necessary boiling point and specific gravity, mixtures of these inert media with each other and with other media mentioned above as suitable.

More specifically, in processes for beading resins which are sulfited (non-nuclear sulfonic acid groups) condensation products of phenol and formaldehyde, the liquid should boil above about 120° C. and be stable to from 90°–160° C. because the resin gels slowly and is best cured at a relatively high temperature. Nuclearly sulfonated phenol-formaldehyde condensation products, on the other hand, gel very rapidly and the liquid medium need therefore only boil above about 70° C. although it must be stable to from 90°–160° C. for curing purposes. Similarly, anion resins which are epichlorohydrin-polyalkylene polyamine or guanidine-melamine-formaldehyde condensation products require a liquid medium which boils above only about 70° C. and in addition, the media for these resins need only be stable up to 130° C. and 110° C., respectively, since higher temperatures will cause some decomposition of the resins.

The mechanical agitation taking place during the process of the present invention is very important. The degree and type of agitation must be sufficient to keep the dispersion from coagulating but it has a variable upper limit depending upon the size of beads desired and the practicality of producing them. With an anchor type stirrer, as used in the examples, a speed of from about 100–200 R. P. M. is generally preferred for the production of resin beads within a range suitable for use in ion-exchange processes, i. e., from about 8–60 mesh, wet-screened, on a standard U. S. Sieve Series (U. S. Bureau of Standards, Standard Screen Series, 1919). However, the speed can go as high as about 600 R. P. M. in which case a much smaller bead is formed from a comparable resin syrup. Furthermore, in many cases variable speed agitation is desirable, gel formation being effected at relatively low speed followed by increased speed to prevent agglomeration of the dispersed particles during the cure. Impeller, impeller-baffle, turbine and other type agitating means may be substituted for the anchor type of the examples.

When extremely small or micro beads are desired, as for medicinal ion-exchange application, a high agitation rate with relatively large amounts of surface active agent are critical factors. In addition, as the rate of agitation is increased, the viscosity of the resin solution may need to be increased in order for bead formation to take place.

The success of my process appears to depend at least in part on the establishment, under any given set of conditions, of an interfacial tension in the resin-medium system which is within a definite range conducive to the formation of spheroidal particles. My process is specific to the particular type surface active agent claimed, however, since not all surface active agents which produce an interfacial tension within the predetermined range will necessarily work. I have found that the cationic hydroxyalkyl amine salts and the quaternary ammonium salts disclosed in the present application are suitable for use in the preparation of phenol-formaldehyde condensation products containing omega sulfonic acid groups in spheroidal form according to the present process.

It may be desirable, according to the process of the present invention, to remove at least a portion of the water from the dispersed resin syrup in order to increase the reflux temperature of the system, particularly if the resin is to be cured in the non-solvent liquid or if it has a relatively slow rate of gelation. In some cases where the rate of gelation is extremely slow, i. e., non-nuclearly sulfonated phenol-formaldehyde resins, it is necessary to remove some water so that the resulting increased temperature will cause gelation before the globules or droplets agglomerate.

Once gelation has occurred and the resin beads are relatively hard and firm, the beads are cured by heating in the presence or absence of a non-solvent liquid at from about 50°–160° C., the preferred curing temperature within the range depending upon the particular resin. For instance, I cure beads of epichlorohydrin-polyalkylene polyamine resin at about 90°–130° C., preferably at about 100°–125° C.; beads of guanidine-melamine-formaldehyde resin at about 50°–110° C. and preferably in two stages, the first around 50° C. and the second around 100° C.; beads of nuclearly sulfonated and non-nuclearly sulfonated phenol-formaldehyde resins at about 90°–160° C., preferably at about 120°–150° C.

The process of the present invention may be applied to the preparation of dyes, pigments, catalysts and ionic or non-ionic resinous materials in the form of spheroidal or micro spheroidal particles which, because of their spheroidal nature, possess special advantages over the corresponding granular products.

Similar processes applied to other type resins and/or other type surface active agents are described and claimed in the copending application of Arthur S. Nyquist, Serial No. 77,071, filed February 17, 1949, entitled "Preparation of Non-Nuclearly Sulfonated Phenol-Formaldehyde Resin in Bead Form" and in my copending applications identified below:

| Serial No. | Filing Date | Title |
|---|---|---|
| 77,070 | February 17, 1949 | Preparation of Nuclearly Sulfonated Phenol-Formaldehyde Resin in Bead Form. |
| 77,069 | February 17, 1949 | Use of Non-Ionic Surface Active Agent in Preparation of Anionic Resin in Bead Form. |
| 77,068 | February 17, 1949 | Use of Cationic Surface Active Agent in Preparation of Anionic Resin in Bead Form. |

I claim:

1. A process which comprises dispersing an aqueous syrup of a partially condensed resin capable of being cured to a water-insoluble ion active product in an inert organic non-solvent liquid which has a boiling point of above about 70° C. and the density of which is substantially equivalent to that of said aqueous resinous syrup, with mechanical agitation in the presence of an anionic surface active agent which is a petroleum sulfonate, maintaining the dispersion at an elevated temperature until the resin gels, and finally curing the gelled resin obtained by heating, sufficient agitation being maintained throughout the heating to prevent coagulation of the dispersion.

2. A process which comprises dispersing an aqueous syrup of a partially condensed resin capable of being cured to a water-insoluble product which is a condensation product of phenol and formaldehyde containing omega sulfonic acid groups in an inert, organic non-solvent liquid which has a boiling point of at least 120° C. and the density of which is substantially equivalent to that of said aqueous resin syrup, with mechanical agitation in the presence of an anionic surface active agent which is a petroleum sulfonate, heating the dispersion to azeotropically remove water from the dispersed resin globules until the temperature of gelation of the resin is attained, and finally curing the gelled resin obtained by heating, sufficient agitation being maintained throughout the heating to prevent coagulation of the dispersion.

3. A process which comprises dispersing an aqueous syrup of a partially condensed resin capable of being cured to a water-insoluble anion active product in an inert organic non-solvent liquid which has a boiling point of at least 120° C. and the density of which is substantially equivalent to that of said aqueous resin syrup, with mechanical agitation in the presence of an anionic surface active agent which is a petroleum sulfonate, maintaining the dispersion at an elevated temperature until the resin gels, and finally curing the gelled resin obtained by heating, sufficient agitation being maintained throughout the heating to prevent coagulation of the dispersion.

4. A process according to claim 1 in which the non-solvent liquid is a chlorinated hydrocarbon.

5. A process in accordance with claim 3 in which the anion active material is a condensation product of epichlorohydrin and a polyalkylene polyamine.

LENNART A. LUNDBERG.

REFERENCES CITED

The following references are of record in the file of this patent:

UNITED STATES PATENTS

| Number | Name | Date |
|---|---|---|
| 2,115,192 | Bruson | Apr. 26, 1938 |
| 2,167,325 | Steindorf et al. | July 25, 1939 |
| 2,167,326 | Steindorf et al. | July 25, 1939 |
| 2,469,683 | Dudley et al. | May 10, 1949 |
| 2,518,420 | Evers | Aug. 8, 1950 |

FOREIGN PATENTS

| Number | Country | Date |
|---|---|---|
| 585,538 | Great Britain | Feb. 11, 1947 |